C. A. AKERLY.
Feather-Renovator.
No. 222,223. Patented Dec. 2, 1879.
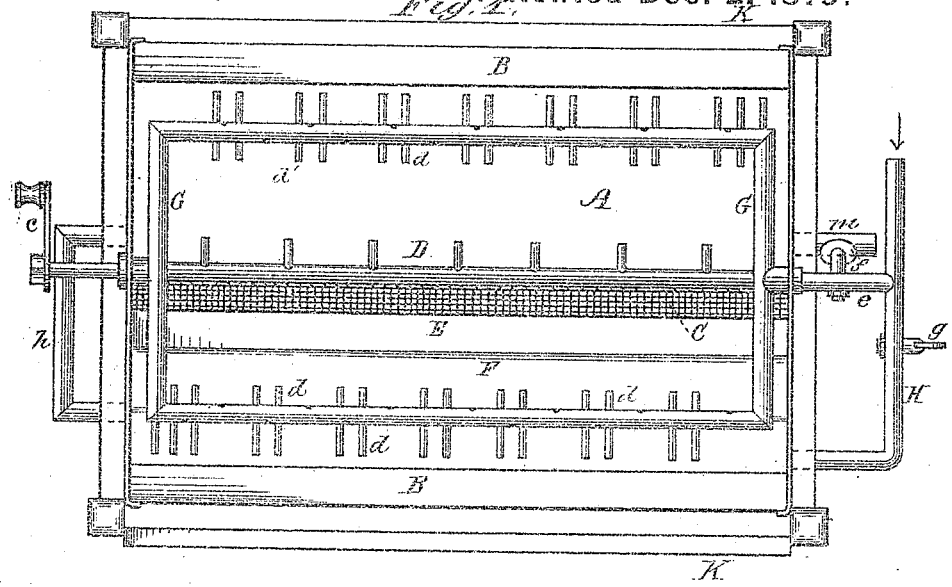
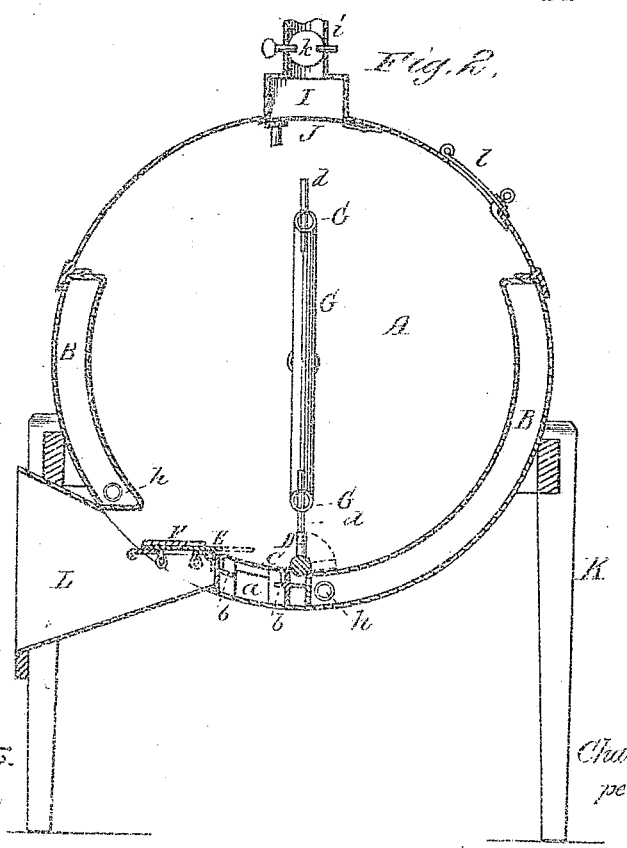
Witnesses
Nat. E. Oliphant
Geo. R. Porter
Inventor
Chas. A. Akerly,
per Chas. H. Fowler
Attorney

UNITED STATES PATENT OFFICE.

CHARLES A. AKERLY, OF OWEGO, NEW YORK.

IMPROVEMENT IN FEATHER-RENOVATORS.

Specification forming part of Letters Patent No. 222,222, dated December 2, 1879; application filed October 6, 1879.

*To all whom it may concern:*

Be it known that I, CHARLES A. AKERLY, of Owego, in the county of Tioga and State of New York, have invented a new and valuable Improvement in Feather-Renovators; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a top-plan view of my invention with the upper portion of the cylinder removed; and Fig. 2 is a cross-section of my invention with the upper portion connected and the rectangular revolving beater-frame in a vertical position.

The present invention has relation to that class of machines employed for the purpose of renovating feathers in which the old feathers may be scalded, purified, and dried, so as to remove effete matter from them, by the employment and use of a revolving steam-discharging beater arranged within a suitable cylinder for containing the feathers; and the invention consists in the details of construction and the arrangement of the several parts, as will be hereinafter described, and subsequently pointed out in the claims.

In the accompanying drawings, A represents a suitable cylinder or chamber of any desirable form and dimensions, and of sheet metal or other material adapted to the purpose.

The lower half or portion of the cylinder A is provided with double walls forming steam-spaces B upon opposite sides thereof.

The steam-spaces B are divided at the bottom of the cylinder to form a channel, $a$, running lengthwise of said cylinder, and covered by a screen or sieve, C. This channel or trough $a$ has formed upon its sides longitudinal flanges $b$, upon which rest the turned-down edges of said sieve to support the same.

Along the side of the sieve, and lengthwise of the cylinder A, is a rake, D, which can be let down or raised at will by a suitable crank attached to the end of the rake from the outside end of the cylinder. The rake D has its bearings in the ends of the cylinder, and by the crank or other suitable connection it can be raised at any angle from a horizontal to a vertical position, as circumstances may require, or when not in use be turned down in a horizontal position or against the upper wall of the steam-space B.

Upon one side of the trough $a$ is a sliding cover, E, connected to the door F in such a manner that it can be adjusted to cover the sieve C, and, when required, removed to allow the refuse from the feathers to pass through the same into the trough, while that remaining on the sieve may be removed with the same, and the sieve cleaned after completing the process of renovating the feathers.

At or near one end of the cylinder A enters the direct steam-pipe G, which branches either way through to the other end of the cylinder, forming a rectangular frame. To this frame, at one end thereof, is connected a crank, $c$, upon the outside of the cylinder, by which the pipe G is rotated. That portion of the pipe lengthwise of the cylinder is perforated for the escape of the steam into the cylinder, and is provided with radial arms $d$. These arms $d$ pass through the steam-pipe G, and extend from either side thereof, but only a short distance in a direction toward the center of the cylinder, so that the mass of feathers will tumble over behind it as it revolves.

The steam-pipe G couples on a section, $e$, of pipe which enters the end of the cylinder and is stationary. This section $e$ may properly be called a continuation of the pipe G, although they are so connected as to allow of the free rotation of the pipe G when required, while the section $e$ is stationary. The section $e$ is provided with a faucet, $f$, for shutting off or admitting the steam to the pipe G, and the section $e$ connects with the pipe H from the steam-generator, said pipe connecting with one of the steam-spaces B at the end of the cylinder, and is also provided with a faucet, $g$. At the opposite end of the cylinder A is a pipe, $h$, which forms a communication between the steam-spaces B for the introduction of the steam from one space to the other.

At the top of the cylinder A is an escape-chamber, I, for the foul steam, which is protected by a screen, J, this screen preventing the escape of the feathers into the chamber I as the foul air passes out through the chimney i, said chimney being provided with a damper, k. This cylinder A is supported by a suitable frame, K, and at one side of the cylinder, running the entire length thereof, is a chute, L, for the discharge of the feathers.

The operation is as follows: The feathers are placed in the cylinder A through a suitable door, l, at or near the top thereof, the cover E being over the sieve C and the rake D turned down. The faucet f is now opened, and the steam let into the pipe G and the same revolved. The steam, escaping through the perforations of the pipe as it revolves, both steams and stirs up the feathers at the same time.

While this operation of steaming is going on, the damper over the escape-chamber in the chimney i is opened sufficiently to allow the escape of the foul steam that rises in the escape-chamber I as fast as fresh steam passes into the cylinder. After the feathers have been sufficiently steamed, stirred, or agitated by the pipe G, with its arms d, to thoroughly soften and loosen the refuse or dirt or animal substances, the faucet f is closed and the faucet g in the pipe H is opened to admit the steam into the chambers or spaces B for the purpose of drying. The steam from the pipe H as the faucet is opened passes into one of the spaces B at one end of the cylinder, and is forced to return through the opposite space by the pipe h, escaping through a suitable outlet, m. The rake D at the bottom of the cylinder is now raised to the required height, and the slide or cover E removed to expose the sieve C, after which the pipe G is revolved, beating the feathers against the rake D, knocking the dirt out, which settles through the sieve C upon the bottom of the trough a, and is removed at the end of the cylinder through a suitable opening closed by a sliding door, as seen in dotted lines, Fig. 2. After the feathers are thus treated a sufficient length of time, the door F is opened and the pipe G revolved, which forces the feathers out onto the chute into the feather-room to cool before using them.

Having now fully described my invention, what I claim as new, and desire to secure by Letters Patent, is—

1. In a machine for renovating feathers, the rectangular revolving frame formed by the steam-pipe G, perforated for the escape of the steam, and provided with arms d, passing through the pipe and extending from each side thereof, the inner ends of the arms being shorter than the outer ends, substantially as and for the purpose set forth.

2. In a machine for renovating feathers, the adjustable rake D, arranged at the bottom of the cylinder A, substantially as and for the purpose specified.

3. The combination, with the perforated steam-pipe G, provided with arms d, of the adjustable rake D, substantially as and for the purpose described.

4. The cylinder A, having rectangular revolving frame formed of the steam-pipe G, provided with arms d, and the steam-spaces B, in combination with the pipes e H, outlet m, faucets f g, and pipe h, constructed and arranged substantially as described, and for the purpose set forth.

5. The cylinder A, provided at its bottom with trough a and sieve C, and the chute L, in combination with the door F, hinged to the walls of the trough and carrying the sliding and adjustable cover E, to close the sieve within the interior of the cylinder, substantially as and for the purpose specified.

6. The cylinder A, having door F and chute L, in combination with the revolving pipe G, provided with arms d, substantially as and for the purpose described.

7. The cylinder A, with steam-spaces B, with their steam-pipe connections, in combination with the revolving steam perforated pipe G, having arms d, substantially as and for the purpose set forth.

8. The cylinder A, with steam-spaces B, trough a, and sieve C, in combination with the cover E and adjustable rake D, substantially as and for the purpose specified.

9. The cylinder A, having steam-spaces B, in combination with the escape-chamber I, screen J, and the revolving pipe G, provided with arms d, substantially as and for the purpose set forth.

In testimony that I claim the above I have hereunto subscribed my name in the presence of two witnesses.

CHARLES A. AKERLY.

Witnesses:
B. C. SPRINGSTEEN,
C. F. PARMELE.